A. Jackson,
Lifting Jack,
N° 68,750. Patented Sep. 10, 1867.

Witnesses.
Theo Tische
Wm. Trewin

Inventor:
A. Jackson
Per Munn & Co
Attorneys.

United States Patent Office.

ALBERT JACKSON, OF CLIFTON SPRINGS, NEW YORK.

Letters Patent No. 68,750, dated September 10, 1867.

IMPROVEMENT IN LIFTING-JACK.

*The Schedule referred to in these Letters Patent and making part of the same.*

TO ALL WHOM IT MAY CONCERN:

Be it known that I, ALBERT JACKSON, of Clifton Springs, in the county of Ontario, and State of New York, have invented a new and improved Lifting-Jack; and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim, and desire to have secured to me by Letters Patent.

The object of this invention is to obtain a lifting-jack for raising the axles of vehicles, which may be constructed at a very small cost, be strong and durable, and capable of being operated with the greatest facility. In the accompanying sheet of drawings—

Figure 1:
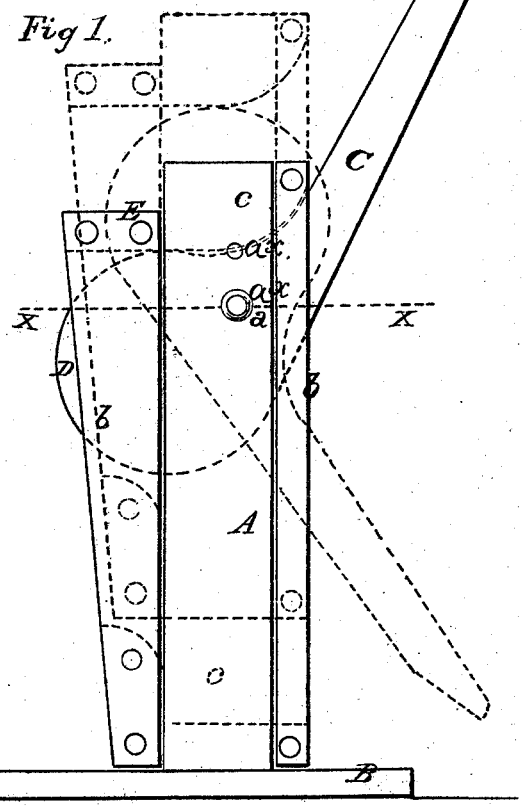

Figure 1 is a side view of my invention.

Figure 2:
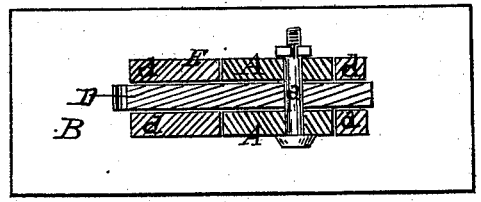

Figure 2, a horizontal section of the same, taken in the line $x\ x$, fig. 1.

Similar letters of reference indicate like parts.

A A represent two uprights, which are parallel with each other, and attached to a suitable base-piece, B, and C is a lever which is fitted between said uprights, and works on a fulcrum-pin, $a$, the latter passing horizontally through the uprights. The portion of this lever C between the uprights is an eccentric, as shown clearly at D in fig. 1. E represents a vertical slide, which is composed of strips $b$ at opposite edges of the uprights, and connected at their upper and lower ends by cross-bars $c\ c$, of such width that they work between the uprights A A, the upper cross-bar $c$ being above the eccentric D. The strips $b$ at one edge of the uprights A are rather lower than those at the opposite edge, as shown clearly in fig. 1, in order that the device may be adjusted to both the front and rear axles of a vehicle without shifting the fulcrum-pin $a$ of the lever C, it being designed to have a plurality of holes, $a^x$, in the uprights, to admit of the lever C being adjusted higher or lower to suit the different height of the axles of different vehicles.

It will be seen from the above description that in order to raise an axle at one end, in order that its wheel may clear the ground and be readily removed, the slide E is adjusted under the axle, the outer end of the lever C being raised, as shown in black in fig. 1, and the most elevated or the lowest strips $b$ being placed under the axle, according to the height of the latter. The outer end of lever C is then pressed down, and the eccentric D, in consequence of working against the under side of the upper cross-bar $c$, raises the slide E and the axle, the eccentric, when the axle is elevated, being retained in position in consequence of the line of pressure being in a vertical line, or nearly so, with the fulcrum-pin $a^x$.

Thus, by this simple means, I avoid all catches or fastenings for holding the lever, and dispense with all iron-work except the fulcrum-pin of the lever and a few screws. The device, therefore, may be very cheaply manufactured, and sold at an extremely low price, and at a fair profit.

Having thus described my invention, I claim as new, and desire to secure by Letters Patent—

A lifting-jack, composed of the uprights A A, base-piece B, slide E, and the lever C, provided with the eccentric D, all being combined and arranged to operate in the manner substantially as and for the purpose set forth.

The above specification of my invention signed by me this 13th day of July, 1867.

ALBERT JACKSON.

Witnesses:
WM. F. McNAMARA,
J. A. SERVICE.